United States Patent

Huska et al.

[15] 3,647,373
[45] Mar. 7, 1972

[54] METHOD AND APPARATUS FOR CONVERTING ALUMINUM NITRATE SOLUTIONS TO ALPHA ALUMINA

[72] Inventors: Paul A. Huska, Carlisle; Herman P. Meissner, Winchester; Thomas J. Lamb, Lexington, all of Mass.

[73] Assignee: Arthur D. Little, Inc., Cambridge, Mass.

[22] Filed: Oct. 16, 1968

[21] Appl. No.: 768,111

[52] U.S. Cl. ..........................23/142, 23/284, 23/262, 23/158, 23/141
[51] Int. Cl. ......................C01f 7/02, C01f 7/08, C01b 21/42
[58] Field of Search....................23/141, 142, 143, 284, 158, 23/262

[56] References Cited

UNITED STATES PATENTS

| | | |
|---|---|---|
| 2,459,836 | 1/1949 | Murphree..........................23/1 F |
| 2,529,366 | 11/1950 | Bauer..............................23/1 F X |
| 2,586,818 | 2/1952 | Harms..............................23/1 F UX |
| 3,211,524 | 10/1965 | Hyde et al........................23/141 |
| 3,275,405 | 9/1966 | Clark..............................23/142 |
| 3,336,109 | 8/1967 | Du Bellay et al..................23/142 |
| 3,366,446 | 1/1968 | Kelly et al.......................23/143 |

*Primary Examiner*—M. Weissman
*Attorney*—Bessie A. Lepper

[57] ABSTRACT

Method and apparatus for converting an aluminum nitrate solution to α-alumina for electrolytic reduction to aluminum. The solution is introduced into a fluidized bed under conditions which remove a substantial portion of the nitrate values as nitric acid vapor and form a solid product which is heated further to remove residual water and nitrate values and to convert the alumina to α-alumina.

11 Claims, 6 Drawing Figures

INVENTORS
Paul A. Huska
Herman P. Meissner
Thomas J. Lamb
Attorney

INVENTORS
Paul A. Huska
Herman P. Meissner
Thomas J. Lamb

Attorney

METHOD AND APPARATUS FOR CONVERTING ALUMINUM NITRATE SOLUTIONS TO ALPHA ALUMINA

This invention relates to the production of pure alumina for reduction to aluminum metal and more particularly to the production of α-alumina from aluminum nitrate solutions with the recovery of a significant portion of the nitrate values in the form of nitric acid.

A process (see U.S. Pat. No. 3,211,524) has been developed which described the recovery of aluminum from clay. In the process the clay is calcined, leached with concentrated nitric acid, and subsequent to the removal of all impurities from the aluminum nitrate solution it is thermally decomposed at from 300° to 600° C. to form alumina of a purity sufficient to permit its direct reduction by the Hall process. Decomposition within this temperature range produces satisfactory alumina, but it also decomposes the nitrate to the oxides of nitrogen which then require expensive processing to be reconverted to nitric acid.

It is possible, however, to heat aluminum nitrate in a manner to avoid extensive decomposition to the nitrogen oxides, and instead to hydrolyze the nitrate and drive off the major portion of the nitrate values as nitric acid vapor which requires only condensation for recycling. In such heating, the higher the temperature the more rapidly the hydrolysis occurs. However, the higher the temperature the more nitrate is again decomposed to the oxides of nitrogen. As the hydrolysis process is continued, especially at the lower temperatures, a solid forms, the structure of which is not precisely known. This material is extremely difficult to handle inasmuch as it takes on a sticky, gluelike consistency which has a tendency to adhere to all surfaces with which it comes in contact. Moreover, difficulties of handling increase with increasing concentration so that it has not been possible heretofore to remove a major portion of the nitrate values from it. Thus, it has been possible to show in laboratory experiments that the hydrolysis and concentration of aluminum nitrate solutions, under certain conditions, can lead to the direct formation of nitric acid and a solid material. There is, however, no known method in the prior art for decomposing an aluminum nitrate solution so that substantially all of the nitrate values can be recovered in the form of nitric acid while producing a satisfactory solid product which can be further processed.

There are in the prior art several patents directed to the processing of aluminum nitrate solutions. One of these patents (U.S. Pat. No. 1,412,754) teaches adding steam to a relatively dilute solution of aluminum nitrate containing other soluble nitrates, such as those of sodium and calcium, to maintain it at a temperature of about 140° C. to crystallize a basic nitrate material which is then separated by filtration. Thus, the nitrate values are eventually divided among the overhead gases, the liquor and the filtrate. German patent 528,795 teaches the thermal decomposition of aluminum nitrate to form alumina and nitric acid under an absolute pressure of 200 mm. by passing steam or hot water through it to maintain it at about 100° C.

U.S. Pat. No. 2,127,504 discloses melting crystals of the ennea-hydrate of aluminum nitrate, driving off 20 to 35 percent of the available nitric acid along with water vapor, and then treating this mass with steam introduced below the surface to maintain it at between 140° and 145° C. After this treatment, a suitable quantity of cooled saturated nitrate solution containing some basic nitrate is added to the molten material to lower the temperature to between 60° and 90° C. Under these circumstances a basic nitrate is precipitated and may be separated by centrifuging.

Finally, U.S. Pat. No. 2,737,445 teaches the heating of concentrated aluminum nitrate solutions on a surface heated to a temperature of about 190° C. in a partial vacuum in which the gas phase is steam. This prior art process assumes that under these conditions the nitrate decomposes to form $N_2O_5$ which is reacted with the excess steam to form nitric acid. One of the requirements of this process is that the heating be above the temperature of the decomposition of the nitrate to effect this process. At least two practical difficulties are encountered in such a process, namely a severe limitation on the amount of heat which can be transferred to the solutions which in turn limits the rate of product formation per unit of equipment; and the necessity to provide a partial vacuum.

The difficulties encountered in the prior art process are overcome in the method of this invention by introducing the concentrated aluminum nitrate solution into a fluidized bed (of alumina, basic aluminum nitrate or other suitable solid particles) which is maintained at a temperature between about 150° and 300° C., and preferably between about 200° and 210° C. with a controlled amount of water vapor present in the fluidized bed gases. Under these conditions the aluminum nitrate is converted to a dry, friable powder which is apparently hydrolyzed aluminum nitrate containing as little as 5 percent nitrate, depending upon the residence time of the solids in the bed. The nitrate in the feed leaves the fluidized bed primarily as nitric acid vapor in the off-gases which can be readily recovered by condensation prior to recycling. The dry solid product from the fluidized bed is then heated to drive off water and any remaining nitrate values to form α-alumina.

The conversion of the aluminum nitrate solution to α-alumina by the process of this invention, which includes as a first step the introduction of the solution into a fluidized bed maintained within specified controlled condition, maintains the system isothermal at optimum conversion temperature and eliminates the handling of any sticky, semisolid material.

It is therefore a primary object of this invention to provide an improved method for converting an aqueous aluminum nitrate solution to α-alumina in a manner to recover a substantial portion of the nitrate values as nitric acid. It is another object of this invention to provide a method of the character described which may be continuous in operation, which eliminates such intermediate steps as crystallization and separation of solids from a liquid, and which produces a material presenting no handling problems. It is yet another object of this invention to provide such a method which achieves the conversion of a solution of aluminum nitrate to α-alumina with a minimum amount of materials handling and a minimum amount of energy input.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in conjunction with the accompanying drawings in which FIG. 1 is a flow diagram of the method of this invention;

Figure 1:
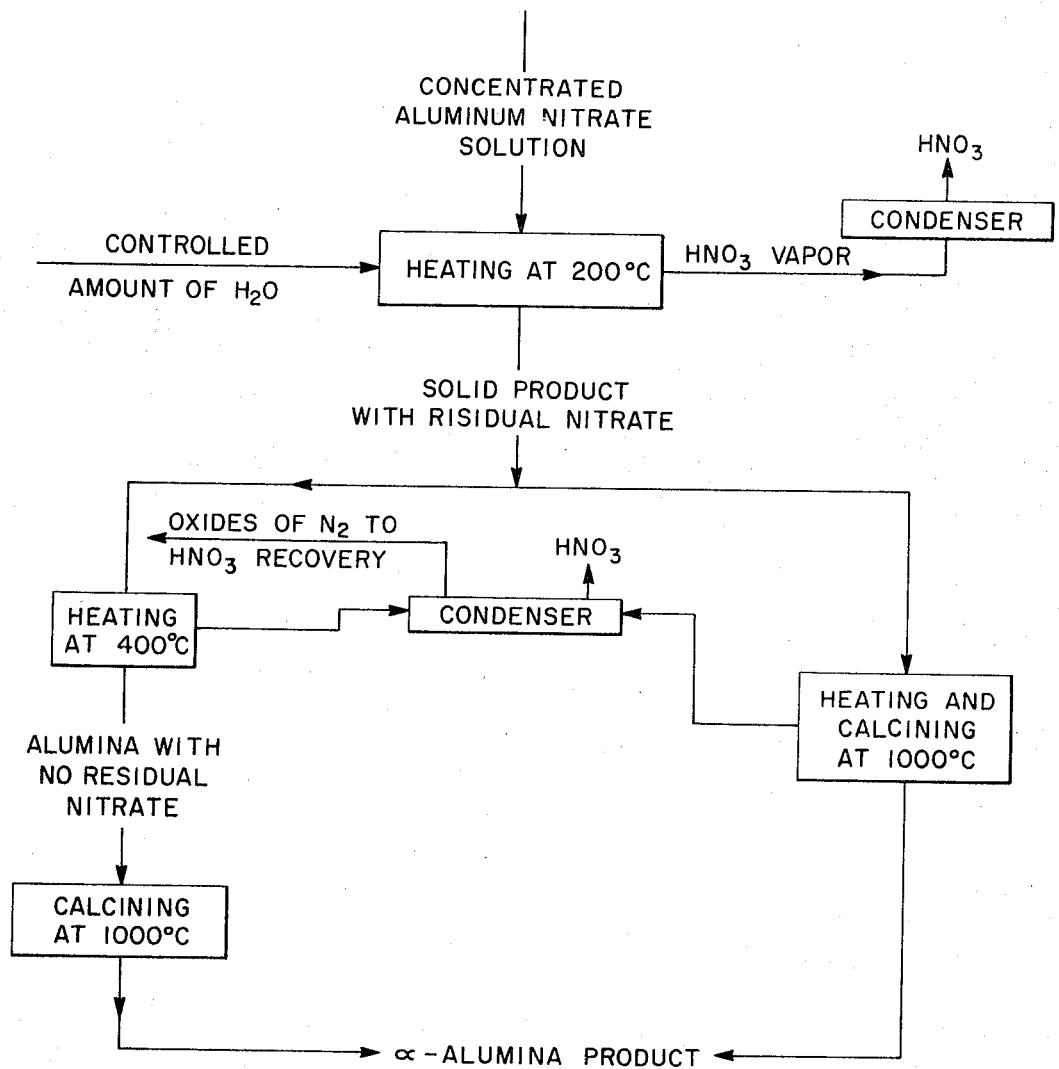

The method of this invention may be explained in detail with reference to the flow diagram of FIG. 1 wherein exemplary temperatures are shown for illustrative purposes only. Typical apparatus embodiments are represented diagrammatically in FIGS. 2, 3 and 4. As will become apparent in the following description, the apparatus components illustrated in FIGS.

2–4 are generally exemplary in nature and the use of other types of apparatus to achieve one or more of the same steps will, of course, occur to those skilled in the art. It is therefore meant to include all variations in the apparatus which may be used to effect the same type of treatment upon the materials processed therein.

Figure 2:
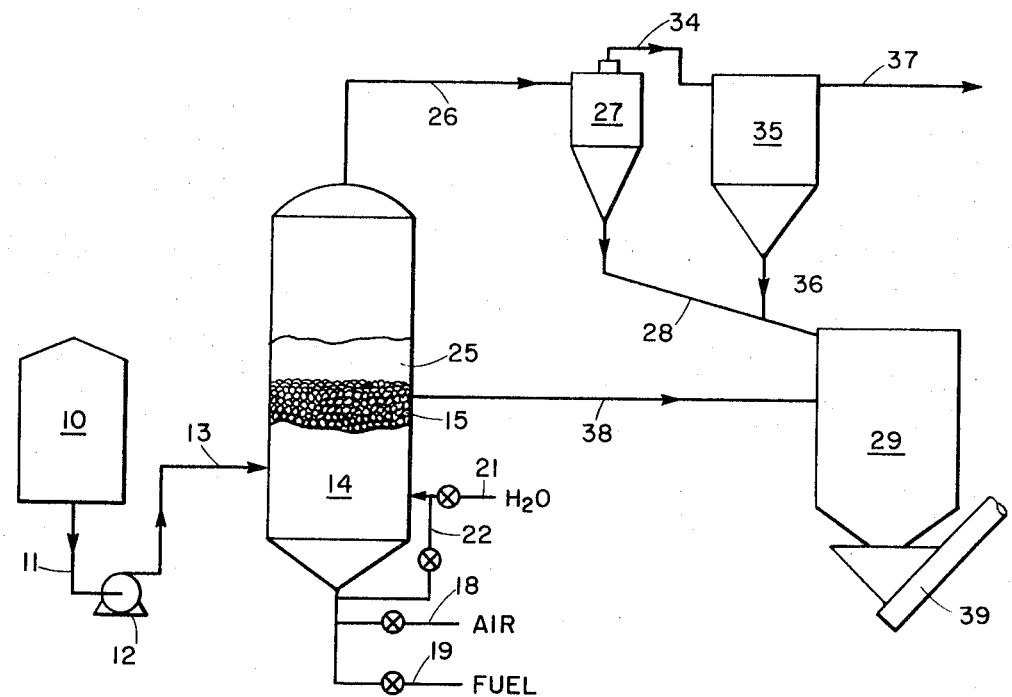
FIG. 2 is a somewhat diagrammatic representation of that portion of the apparatus used to convert the aluminum nitrate solution to a dry product.

FIG. 2 illustrates typical apparatus used to produce the first dry hydrolyzed product from the aluminum nitrate feed stock. The product is apparently primarily hydrolyzed aluminum nitrate with a small amount of residual nitrate. In the apparatus of FIG. 2 the aluminum nitrate solution (which may or may not be concentrated) is supplied from a storage tank 10 through a suitable conduit 11 by means of pump 12 to an inlet line 13 of fluidized bed 14. The inlet line 13 will, of course, have associated with it a suitable nozzle which introduces the aluminum nitrate solution onto the bed particles 15 in a suitably atomized form. The bed particles are heated by combustion products, the air and fuel for combustion being introduced into the bottom end of the chamber defining the fluidized bed through lines 18 and 19 in accordance with well-known fluidized bed procedures.

It is necessary to control the amount of water vapor within the fluidized bed. This may be done by providing water from one or more of three sources, namely the water contained in the aluminum nitrate feed stock, the water produced by the combustion of the air and fuel, or from an external source delivered to the bed through water inlet conduit 21 or into the combustion gases prior to their introduction into the bed through conduit 22. It is, of course, within the scope of this invention to use any combination of these water sources.

The fluidized bed gases in volume 25 above the bed particles are withdrawn through discharge line 26 carrying with them essentially all or part of the dry solid product formed on the surface of the particles 15. The exit gases bearing the finely divided dry product comprise nitric acid, a small quantity of nitrogen oxides, some water vapor and products of combustion. The fine powder product is carried by the discharged gases to a cyclone separator 27 from which the solid product is transferred by means of line 28 into a storage bin 29. The gases exhausted from cyclone separator are carried by means of line 34 into a suitable filter 35 which removes any residual dry product for transfer by way of discharge line 36 to the storage bin 29. The gases discharged from the filter are transferred by line 37 to a suitable condensing apparatus wherein the nitric acid vapor is condensed to liquid nitric acid. The solid product may also be withdrawn as larger particles through the bed overflow line 38 which is in direct communication with storage bin 29.

Figure 3:
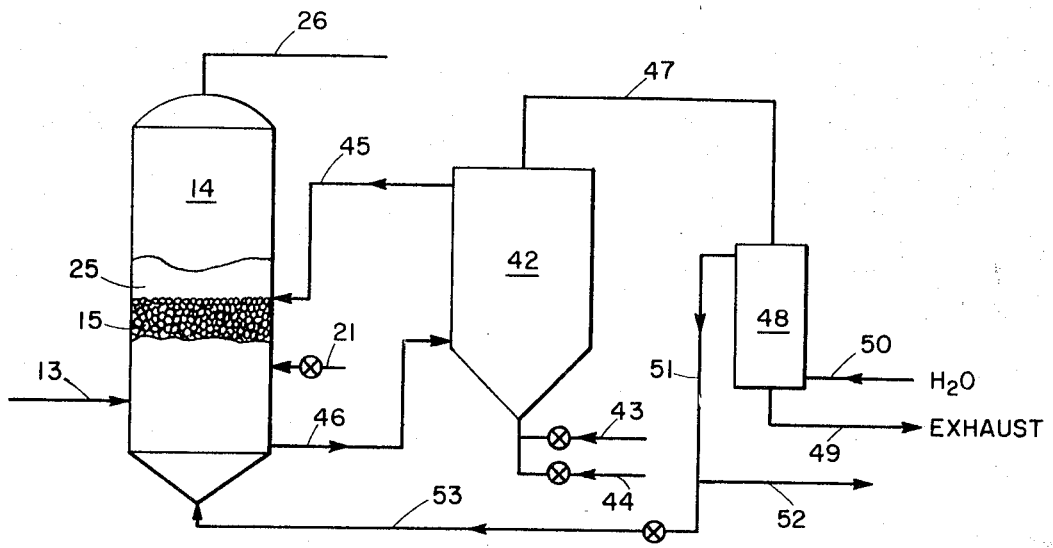
FIG. 3 is a modification of the apparatus of FIG. 2.

Fig. 3 illustrates a modification of the apparatus in FIG. 2 wherein the fluidized bed particles 15 are heated indirectly in a separate particle heater. This modification has the advantage that the products of the combustion of air and fuel are not introduced into the fluidized bed exhaust gases and hence do not contaminate the nitric acid vapor.

In FIG. 3 like components are given the same reference numerals as in FIG. 2. The bed particle heater 42, which may be of any suitable design, is provided with air and fuel for combustion through inlet lines 43 and 44, respectively. The heated bed particles 15 are conveyed from the heater to the fluidized bed through line 45 and are returned from the bed to the heater for reheating through line 46. The combustion gases discharged from the heater 42 are transferred by means of line 47 to a boiler 48 from which they are exhausted through line 49. In the arrangement illustrated in FIG. 3 the heat in the boiler is used to form steam from water introduced through line 50. The steam leaving boiler 48 by way of line 51 may be used for various purposes; and in FIG. 3 a portion of it is sent to various required points in the system through line 52, and another portion is introduced through line 53 into the fluidized bed to provide a portion of the required water vapor in the fluidized bed.

Figure 4:
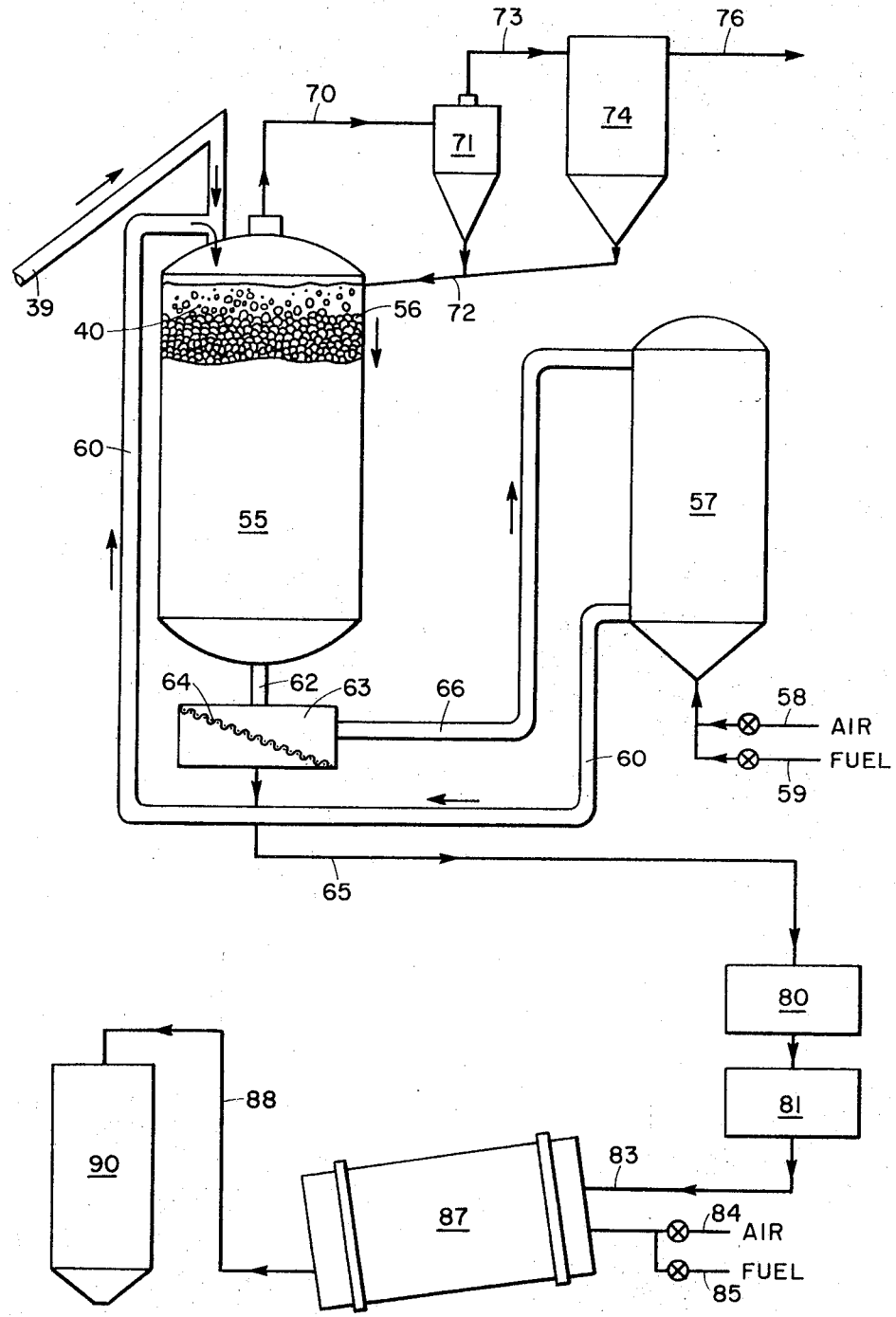
FIG. 4 is a somewhat diagrammatic representation of exemplary apparatus used in converting the dry product to the desired α-alumina.

The apparatus shown somewhat diagrammatically in FIG. 4 is used to illustrate typical devices which may be used to complete the conversion to alumina and the removal of the residual nitrate values, and finally to convert the alumina to the alpha form. The apparatus illustrated includes a traveling bed heater for nitrate removal and a rotary kiln for the final calcination of the material.

The dry solid product taken from the fluidized bed and stored in bin 29 (FIG. 2) is transferred by a suitable conveyor means 39 as solid product 40 into a moving bed heater 55. Suitable pebbles 56, such as alumina pebbles, are heated in a pebble heater 57 through contact with combustion gases which result from the reaction between air and fuel introduced into the heater 57 through lines 58 and 59. The heated pebbles are then conveyed through conduit 60 from the bottom of heater 57 into the top of moving bed heater 55 where they come in contact and mingle with dry product 40 from the fluidized bed. As the pebbles 56 move downwardly they transfer heat to the dry product; driving off a small quantity of $HNO_3$ and decomposing the remaining nitrate present in the dry product to the oxides of nitrogen. The alumina thus formed is removed through discharge conduit 62 to be conveyed to a separator 63 containing a suitably sized screen 64 which permits the final alumina product to pass therethrough and to enter product discharge line 65. The pebbles are retained on screen 64 and returned through conduit 66 to the top of the pebble heater 57 for reheating and recycling.

The exhaust gases from heater 55 are taken by means of line 70 into a cyclone separator 71 from which the fine dry product is returned by means of line 72 into the moving bed heater 55. The exhaust gases which are primarily oxides of nitrogen are then introduced into a filter 74. Any very fine product material which is removed by the filter is also returned to the moving bed heater 55 while the cleaned exhaust gases are discharged by line 76 to a suitable nitric acid recovery system. The nitric acid recovered in this system is preferably added to the nitric acid vapor recovered from the fluidized bed and recycled for leaching the aluminum from the clay.

If the temperature within the moving bed heater 55 is maintained at a level designed primarily to complete the decomposition of the aluminum nitrate, then it is necessary further to heat the alumina removed by line 65 to calcine it and convert it to the desired alpha form. This may be done conveniently by first preheating the alumina such as by passing it through several preheaters of suitable design (indicated by numerals 80 and 81 in FIG. 4), and then introducing it through a proper inlet line 83 into a rotary kiln 87 constructed according to well-known practice. The kiln is heated such as by the combustion of air and fuel brought in through lines 84 and 85. The α-alumina discharged from the kiln is then transferred through conduit 88 into a storage bin 90. This material is suitable for introduction into a Hall electrolytic cell for direct reduction to aluminum metal.

It is necessary to operate the apparatus of FIGS. 2 and 3 under controlled conditions in order to obtain the objects of the method of this invention. Among the important operational parameters are the fluidized bed temperature, water vapor content, physical characteristics of the bed particles, average residence time of the particles in the bed and residence time of the nitric acid vapor in the bed.

In the fluidized bed it is necessary to maintain the particles at a temperature such that when the aluminum nitrate feed stock is atomized onto their surfaces, the liquid is substantially instantaneously dried, the temperature of the feed stock and dry product being raised to between about 150° and 300° C. Generally, for reasons of economics, it is preferred that the temperature range between 200° and 210° C. Temperatures which are materially below 200° C. do not effect sufficient removal of the nitrate while those materially in excess of 210° C. bring about excessive decomposition of the nitrate to the oxides of nitrogen. This in turn materially increases the cost and the amount of equipment required to convert these oxides of nitrogen to nitric acid for recycling. When operating continuously so that residual nitrate values in the solid product overflow are about 5 percent, then the remaining nitrate leaves the solid as nitric acid and as nitrogen oxides. The weight percent of the nitrate in the feed decomposed to the nitrogen oxides increases with bed temperature as shown in FIG. 5.

Figures 5, 6:
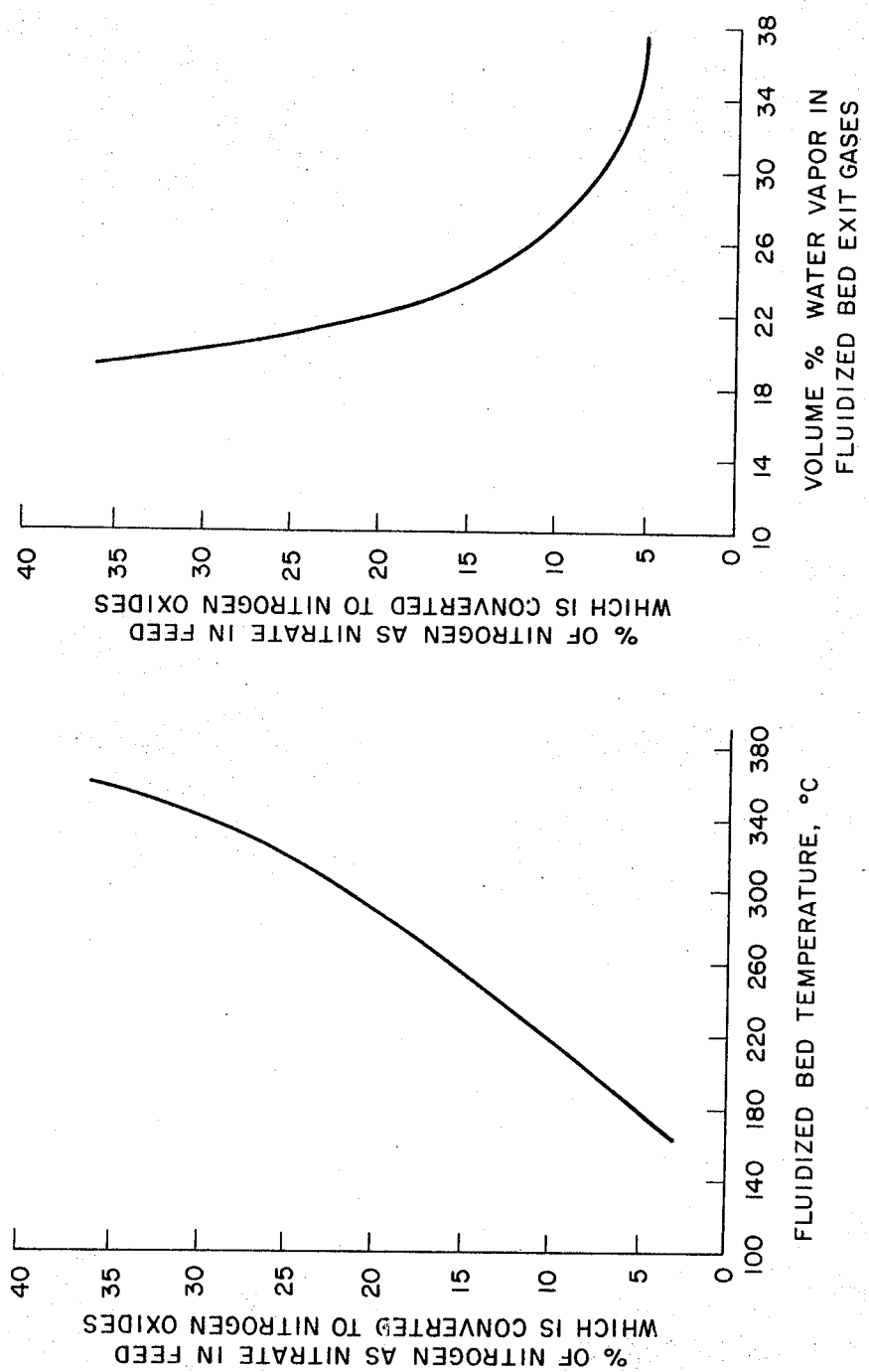
FIG. 5 is a plot showing the influence of fluidized bed temperature on the amount of nitrate values in the feed which is decomposed to the nitrogen oxides.
FIG. 6 is a plot showing the influence of the amount of water vapor in the fluidized bed exit gases on the amount of nitrate values in the feed which is decomposed to the nitrogen oxides.

Examination of FIG. 5, which is a plot of the percent of nitrogen as nitrate of the aluminum nitrate feed which is converted to nitrogen oxides in the fluidized bed, illustrates the very rapid rise in the extent of decomposition which occurs with increasing bed temperature. Inasmuch as it is desired to maintain the amount of nitrate thus decomposed below the 10 percent level, it is preferable to maintain the fluidized bed particles at a temperature such that the dry solid product which forms thereon remains within the temperature range of between 200° and 210° C.

As previously stated, it is also necessary to control the volume percent of water vapor in the fluidized bed gases maintained over the bed particles. FIG. 6 is a plot showing the weight percent of the nitrate values in the aluminum nitrate feed which is decomposed to the oxides of nitrogen as a function of the volume percent of the water vapor in these fluidized bed gases. Again, if the amount of nitrate in the feed decomposed to the oxides of nitrogen is to be kept about 10 percent or lower, then it is necessary to maintain the volume percent of water vapor in the fluidized bed gases no lower than 25 percent and preferably between about 35 to 45 percent. The manner in which the water vapor content in the fluidized bed gases may be controlled has been previously described in discussing FIGS. 2 and 3.

The concentration of the aluminum nitrate feed solution may vary over a relatively wide percentage range, but it is normally from about 25 to 57 percent by weight, the upper limit being attained when the aluminum nitrate has been concentrated to form the ennea-hydrate of aluminum nitrate which when heated will dissolve in its water of hydration. The aluminum nitrate feed solution is preferably introduced into the fluidized bed at an elevated temperature, e.g., about 60° C. Both the flow rate of aluminum nitrate feed solution into the bed and the fluid velocity of the bed particles will be maintained at optimum rates consistent with well-known and accepted fluidized bed practice.

The fluidized bed will generally be operated at atmospheric pressure and it is desirable that the residence time of the nitric acid vapor be maintained at a minimum to prevent any decomposition of the vapor. In the fluid bed this prompt withdrawal occurs automatically in that the nitric acid vapors leave in the tail gases.

The surface characteristics of the bed particles appear to exercise some influence on whether or not the dry solid product withdrawn from the bed is a finely divided friable material suspended in the exhaust gases or is in the form of small pebblelike particles. It will generally be preferably to start the fluidized bed operation using alumina particles. As the bed continues to operate these particles assume the same composition as the produce material, i.e., a hydrolyzed aluminum nitrate with a small amount of nitrate content. If the bed particles are essentially nonporous in character, the dry solid product is normally in a finely divided state and a major portion of it is withdrawn with the exhaust gases through line 26 and then separated within the cyclone separator 27. If, however, the bed particles are at least somewhat porous in nature the dry solid product will build up on these particles and a major portion of it may be withdrawn by way of the bed overflow line 38. In normal practice the dry product will be removed both through overflow line 38 and suspended in the exhaust gases.

In the operation of the apparatus modification of FIG. 3 it is, of course, necessary to heat the bed particles to a temperature such that as they arrive in fluidized bed 14 they will substantially instantaneously raise the temperature of the aluminum nitrate feed stock injected into the bed to the prescribed temperature.

If the aluminum nitrate feed stock does not contain sufficient water to supply the desired quantity of water vapor in the fluidized bed gases then the additional amount of water required may be introduced by injecting water directly onto the bed particles, by introducing steam up through the bed, or by a combination of both of these procedures.

The removal of the residual nitrate and the calcining of the resulting alumina may be carried out as a single heating step or as two distinct heating steps. If a single step is to be employed then the temperature in the moving bed heater 55 (FIG. 4) must be maintained at about 1,000° C. However, it is preferred that two distinct heating steps be performed, the first being to convert the hydrolyzed product to alumina and to remove all of the residual nitrate and the second to calcine the alumina. In this case the temperature of the moving bed heater 55 should be maintained at about 400° C. at which temperature the residual nitrate is removed primarily in the form of the oxides of nitrogen, although a minor portion of the nitrate may be in the form of nitric acid vapor which can be condensed directly. By using this type of heating, i.e., by preheating the pebbles prior to their contacting the dry product from the fluidized bed, it is possible to withdraw nitric acid and oxides of nitrogen from the moving bed heater 55 in relatively pure form, i.e., undiluted by combustion product gases. This materially simplifies the recovery of the nitric acid.

The final calcining of the alumina should be carried out at a temperature of about 1,000° C. for a time sufficient to convert all of the alumina to the alpha form. This conversion step is well known in the Bayer process. However, in this prior art process the conversion is typically performed on wet material, a fact which requires a much larger heat input since it is not only necessary to effect the crystalline conversion, but to vaporize the water. Thus the process of this invention represents an improvement over the prior art in that calcining is performed on a dry product.

By the method of this invention it is possible to recover as much as 95 percent of the nitrate content of the original aqueous feed stock as nitric acid, and to handle materials which present no difficulties in processing. This it is relatively easy to inject liquid into the fluidized bed and to transport, store and process the dry solid material which comes first from the fluidized bed and then from the moving bed heater. The amount of oxides of nitrogen which must be processed to form nitric acid is minimized. It is also possible to so control the operation of this method to prevent any dilution or contamination of these oxides of nitrogen.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A method of converting an aqueous aluminum nitrate solution to $\alpha$-alumina, comprising the steps of
   a. introducing an aqueous aluminum nitrate solution feed stock into a fluidized bed, the particles of which are heated to a temperature to substantially instantaneously heat said feed stock to a temperature between about 150° and 300° C. to form a dry solid product on said particles;
   b. maintaining a water vapor concentration in the fluid bed gases of at least 25 percent by volume, whereby a major portion of the nitrate values of said feed stock is vaporized as nitric acid in forming said solid product;
   c. withdrawing from said fluidized bed said solid product which contains a small amount of residual nitrate and fluidized bed gases in which not more than about 10 percent by weight of the nitrate values are decomposed to oxides of nitrogen, the remaining nitrate values being withdrawn as nitric acid; and d. heating said solid fluid bed product to a temperature sufficient to decompose said residual nitrate to gaseous oxides of nitrogen and then calcining the resulting alumina to $\alpha$-alumina.

2. A method in accordance with claim 1 wherein said fluidized bed particles are at a temperature to substantially instantaneously heat said feed stock to a temperature between about 200° and 210° C.

3. A method in accordance with claim 1 wherein said water vapor concentration is maintained within said fluidized bed at the desired level by injecting water into said fluidized bed.

4. A method in accordance with claim 1 wherein at least a portion of said water vapor is present in the fluidizing gases entering said bed.

5. A method in accordance with claim 4 wherein at least a portion of said water vapor in said fluidizing gases is formed by the reaction of fuel and oxygen.

6. A method in accordance with claim 1 wherein said particles in said fluidized bed are heated externally of said fluidized bed to the desired temperature and then circulated through said bed.

7. A method in accordance with claim 1 wherein said water vapor concentration is maintained between about 25 and 45 percent by volume of said gases.

8. A method in accordance with claim 1 wherein said feed stock is at a temperature up to about 60° C. at the time of its introduction into said fluidized bed.

9. A method in accordance with claim 1 wherein said particles have surface characteristics which permit the deposit of said solid dry product thereon.

10. A method in accordance with claim 1 wherein step (d) is carried out in two succeeding steps and wherein said heating of said fluidized bed product is carried out at about 400° C. and said calcining is carried out at about 1,000° C.

11. A method in accordance with claim 10 wherein said heating of said fluidized bed product is accomplished by contacting said fluidized bed product with pebbles preheated to the required temperature prior to said contacting.

* * * * *